(12) United States Patent
Gaunt

(10) Patent No.: US 8,156,900 B1
(45) Date of Patent: Apr. 17, 2012

(54) ANIMAL CLAW LIVE TISSUE SENSING METHOD AND APPARATUS

(76) Inventor: John W. Gaunt, Greenwood, DE (US)

( * ) Notice: Subject to any disclaimer, the term of this patent is extended or adjusted under 35 U.S.C. 154(b) by 1203 days.

(21) Appl. No.: 11/861,162

(22) Filed: Sep. 25, 2007

Related U.S. Application Data

(60) Provisional application No. 60/846,897, filed on Sep. 25, 2006.

(51) Int. Cl.
 *A01K 13/00* (2006.01)
 *G01R 27/08* (2006.01)
(52) U.S. Cl. .................. 119/601; 119/610; 324/692
(58) Field of Classification Search ............ 119/600, 119/601, 608, 609, 610; 324/692; 30/26, 30/27, 28, 29, 123, 145; 132/75.4, 75.5, 132/75.3, 73.5
See application file for complete search history.

(56) References Cited

U.S. PATENT DOCUMENTS

| | | | | |
|---|---|---|---|---|
| 4,079,368 A | * | 3/1978 | DiStefano | ................. 345/60 |
| 7,000,321 B1 | * | 2/2006 | Rodgers | ...................... 30/29 |
| 7,137,356 B2 | * | 11/2006 | Huggans | ................... 119/601 |
| 7,428,881 B2 | * | 9/2008 | Drelinger | ................. 119/610 |
| 7,640,892 B2 | * | 1/2010 | Huggans | ................... 119/601 |
| 7,848,799 B2 | * | 12/2010 | Herndon | .................. 600/547 |
| 7,856,275 B1 | * | 12/2010 | Paul et al. | .................. 607/55 |
| 2006/0042559 A1 | * | 3/2006 | Kang | ...................... 119/600 |
| 2010/0107989 A1 | * | 5/2010 | Manheimer et al. | ......... 119/600 |

* cited by examiner

*Primary Examiner* — Rob Swiatek
*Assistant Examiner* — Joshua Huson
(74) *Attorney, Agent, or Firm* — Rick B. Yeager

(57) ABSTRACT

An electronic method and apparatus to externally sense and identify the position of live tissue within an animal claw, including opaque claws. The live tissue (quick) position is determined by electrical conductivity measurements along the claw, so that the claw can be cut or marked. A receptor electrode positioned on the claw measures conductivity resulting from either a source electrode placed on the animal, or from the electro-magnet field created by the ambient presence of radiated line voltage. A multi point contact electrode which does not require calibration, comprises alternating hydrophilic and hydrophobic sections. A claw receptacle conforms the electrode to the claw.

20 Claims, 5 Drawing Sheets

ANIMAL CLAW LIVE TISSUE SENSING METHOD AND APPARATUS

RELATED APPLICATIONS

This non-provisional application is related to U.S. Provisional Application No. 60/846,897 filed Sep. 25, 2006 by applicant, and claims the benefit of that filing date.

BACKGROUND

1. Field of the Invention

This invention relates to the field of pet and animal grooming, particularly claw trimming.

2. Prior Art

The current invention is an electronic method and apparatus that will externally sense and identify the position of live tissue within an animal claw, including opaque claws that completely prevent visual identification of live tissue (quick) position. It is well known by veterinarians and pet groomers that accidental cutting of an animal claw quick causes pain, bleeding and possible infection in the animal.

U.S. Pat. No. 7,000,321 issued Feb. 21, 2006 to Rodgers describes a device where a optical source illuminates a portion of an animal nail, and an optical sensor receives light from the illuminated portion. A processor generates a signal level, and differentiates between a "quick" signal level range (arising from illuminated living tissue in the nail) and a "nail" signal level range (arising from illuminating a nail portion with no living tissue). An indicator informs a user when the signal level is in the quick or nail range, determining the location of living tissue within the nail. Source(s) and sensor(s) may be mounted on an animal nail clipper, with illumination by the source and collection of light for receiving by the sensor occurring at a position relative to a blade so that when the signal level is within the nail range and the clipper is actuated to cut the nail, cutting of the living-tissue-containing portion of the animal nail is avoided.

U.S. Pat. No. 7,137,356 issued Nov. 21, 2006 to Huggans describes a claw cutter which incorporates a sensor device and scan system technology into a hand-held trimming device that locates the location for a proper cut, avoiding cutting the quick and avoiding pain to the animal. The scan system technology may include a light sensor, an infrared sensor, a laser sensor, an ultrasonic sensor, or an intensity transducer. A control circuit determines the position status of the cutting device and via audible and or visual alert advises the clipper operator that the clippers are positioned in either an unsafe zone or a safe zone for cutting the claw.

These prior art patents describe possible scanning methods for theoretically sensing an animal quick, including infrared, ultrasonic, light/laser optical, pulse oximetery and other scanning technologies.

SUMMARY OF INVENTION

The current invention describes improved sensing methods and devices and describes improved claw marking and claw cutting tools which use the improved sensing methods and devices. The current invention provides a unique, inexpensive, extremely accurate, and consistent method for locating the position of live tissue in any animal claw.

One embodiment of the current invention is an electrical conductivity method of determining the presence of live tissue within an animal claw. The conductivity is sensed with an electrode placed over at least a portion of the claw. In one example, a low level of alternating current, such as is generated by a low level relaxation oscillator through a million ohms resistor, may be provided through a source electrode with a second (receptor) electrode placed against the animal's skin. In another example, the electro-magnet field created by the ambient presence of radiated line voltage AC, which is present in any electrically wired building, can also be utilized for source electrode in place of a low level relaxation oscillator operating through a million ohms resistor.

In one embodiment, an improved electrode is provided by a multi point contact electrode which does not require calibration, and which is robust with respect to user related variables. In one example, the multi point contact electrode is a segmented receptacle where multiple electrically isolated points of contact are provided. One example of isolating the points of contacts is to provide a hydrophilic material as islands or strips relative to a surrounding hydrophobic material. The hydrophilic material establishes electrical conductivity in the presence of small amounts of water. These multiple electrically isolated points of contact are typically provided in a head which is temporarily fixed relative to a claw, so that the multiple points provide a plurality of readings generally along the longitudinal axis of the claw. The point with the greatest difference in voltage represents the quick. The points of contact are conformed to the claw such as with pliable material housing or a clamp and tensioning band.

In observations using live animals (dogs) with a prototype of the proposed device, it is demonstrated that there is a large, measurable millivolt (volts $10^{-3}$) signal difference between the live tissue area of the animal's claw and the non-live area of tissue of the animal's claw. This signal amplitude difference is ratio and varies from quick (live tissue) signal in a range of 2-8 times the non-quick (non-live tissue) signal. In other words, the measured millivolt result of live tissue produces from two to eight times the signal strength of the non live tissue signal strength. These observational experiments were performed 500 times on the subject animal's claw and demonstrated repeatable results that allowed the operator of the prototype to identify the location to the animal's live tissue quick located it the claw, independent of the pigment and obscurity of the subject's claw.

Another embodiment of the current invention is a marking pen which detects the presence of live tissue within an animal claw and provides a mark at the outer extent of the quick. In one example the marker nib is saturated with water or other polar or saline solution so that it acts as an electrode.

Another embodiment of the current invention is a claw cutting device which detects the presence of live tissue within an animal claw and secures the device to the claw so that the claw may be cut beyond the quick.

DESCRIPTION OF EMBODIMENT

Conductivity Method for Live Tissue Sensing

The invention and the various features and advantageous details thereof are explained more fully with reference to the nonlimiting embodiments that are illustrated in the accompanying drawings and detailed in the following description. It should be understood that the detailed description and the specific examples, while indicating specific embodiments of the invention, are given by way of illustration only and not by way of limitation. Various substitutions, modifications, additions and/or rearrangements within the spirit and/or scope of the underlying inventive concept will become apparent to those of ordinary skill in the art from this disclosure.

Sensing Method

Figure 4:
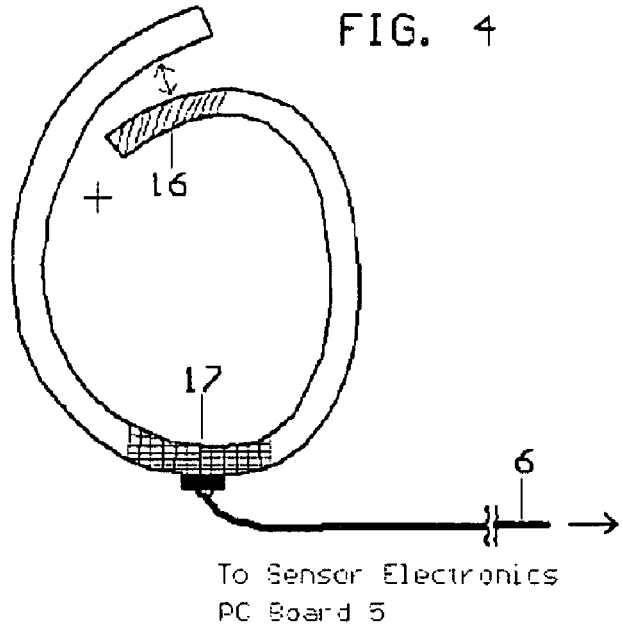
FIG. 4 is a perspective view of the conducting body strap component of FIG. 1 and FIG. 3 embodiments of invention

In this embodiment, a live tissue sensing method involves coupling an ultra low-level alternating current (AC) signal such as generated by a low level relaxation oscillator through a million ohms resistor into the outer surface animal skin via an electrically conductive strap placed in contact with the generally hairless underbelly or any other open skin area of an animal. FIG. 4 shows an adjustable conductive strap that can be securely attached, via Velcro segment 16, to the animal body. A. conductive strip 17 comprises a carbon or conductive cloth which serves as an electrode and contacts animal skin to couple the AC signal to surface layer of skin.

Alternatively, the ambient presence of radiated line voltage AC (found in any electrically wired building) can also be utilized as the source electrode (with no physical source electrode or contact necessary with animal) in conjunction with a receptor electrode. The ambient radiated line voltage replaces a low level relaxation oscillator source in this embodiment. The low level signal safely and uniformly propagates throughout all of the animal skin, including the underlying claw quick tissue. An amplified electrode (such as a high impedance electronics signal amplifier paired with an electrode (as known to those skilled in the arts) with a wet, polar, contact interface surface (such as porous plastic saturated with saline solution) is moved along the keratin claw surface and a strong signal is coupled beneath the probe where the quick is present. In the non-quick area of the claw, the signal is of significantly lower amplitude, thus allowing the end of quick interface to be electronically located.

In the case of a moving receptor electrode, it is generally desirable to move the electrode from the outer tip of the claw toward the paw so that the point of maximum voltage difference can be detected. Movement in this direction prevents bridging where a reading beyond the quick might be a false reading caused by a trail of moisture from the head to above the quick. In one alternative, a wiper can be included in the head to remove any trail of moisture.

Marking Tool

Figure 1:
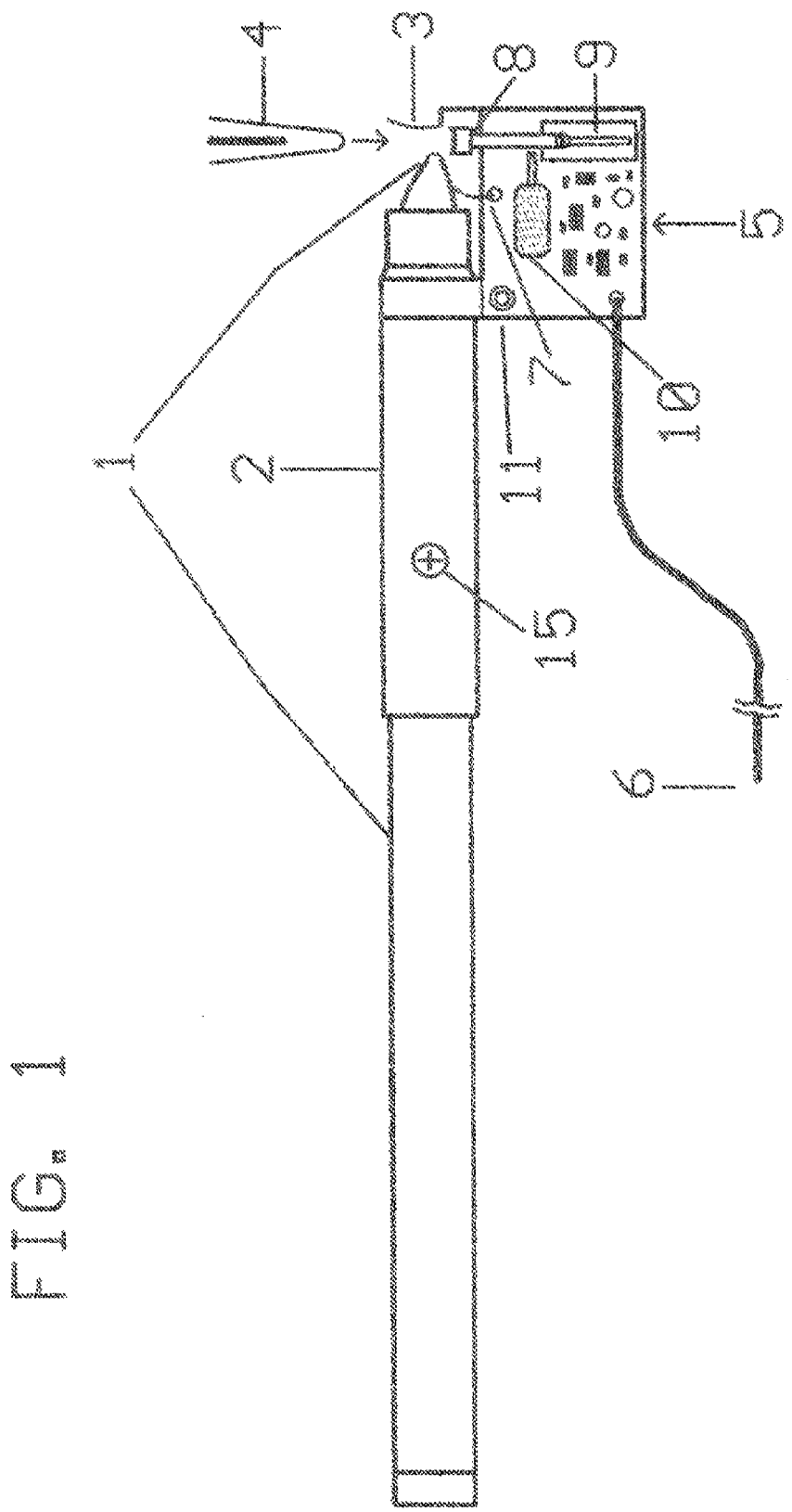
FIG. 1 is a top view of an animal claw marking tool constructed in accordance with one embodiment of the invention.

FIG. 1 is a top view of one low cost embodiment utilizing the animal claw live tissue sensing method. Also shown in FIG. 1 is an animal claw 4, positioned for entry into the apparatus. In this low cost embodiment, a commercially available continuous wick-flow water-based white paint marker 1 is mounted in camp sleeve 2. Due to the chemically polar nature of the water-based marker, it functions as a wet-electrode that electrically interfaces with animal claw 4 when claw is inserted into apparatus against contact spring 3. Contact spring 3 is shaped such that it functions to both center claw 4 and to provide spring loading against marker/electrode 1. Electrode contact brush 7 electrically connects marker/electrode 1 tip to sensor electronics PC board assembly 5. A spring loaded claw position sensor/stop 8 provides electronic position feedback via linear potentiometer 9 and also functions to mechanically stop claw entry via stop solenoid 10 pressure contact with 8 when the live tissue region of the claw is detected by sensor electronics PC board assembly 5. The sensor electronics performs sample/hold calibration and threshold detection functions to detect signal amplitude or phase changes in the low level AC signal, and can be simple, inexpensive analog operational amplifiers with supporting components. All parts, battery and electronic components, with exception of marker/electrode 1, are directly mounted to sensor electronics PC board assembly 5, which pivots via a locking rotational mount 11 to enable airtight capping of marker/electrode 1. This integrated assembly design enables the device to be manufactured at a very low cost.

Operation

For the purpose of clarity, the following theory of operation describes the tissue sensing method as it applies to the basic FIG. 1 embodiment, but is not limited to and can be functionally extended to the attachment to other embodiments.

FIG. 1 shows a device that is used to sense live tissue and physically draw a visible white identification mark on the surface of opaque or black animal claws. The white mark indicates the safe (non-quick) area of the claw, thus allowing the claw to be safely trimmed with any standard cutting or grinding tool. The user first attaches the body conductor strap (FIG. 3) via shielded cable 6 to contact a hairless portion of the animal body; in the case of a dog or cat, the lower underbelly consistently has limited fur and is easily accessible. The strap 6 is used to conduct an ultra low current AC oscillator signal from sensor electronics PC board 5 into the animal surface layer of skin. The AC signal safely propagates throughout the outer skin tissue of the animal body, including the claw live tissue (quick). The user sides the end of the device over the claw such that guide 3 aligns the claw and spring loads it against the tip of marker/electrode 1. As soon as the claw tip makes contact with and moves position sensor/stop 8, the sensor electronics 5 begins sampling/calibration of the AC signal amplitude via the wet tip of marker/electrode 1.

Due to the keratin protein structure of the claw and its membrane adhesion to the quick as known to those skilled in the sciences of animal anatomy, the AC signal is also present on the claw surface and can be electrically coupled through the wet marker/electrode 1 tip. The user continues to slide the device over the animal claw until the live tissue quick region is approached by the electrode tip, at which time, sensor electronics 5 detects a substantial increase in the AC signal amplitude. Once the signal strength exceeds a dynamically preset threshold calibration value, sensor electronics 5 triggers stop solenoid 10, locking the movable spring-loaded shaft of position sensor/stop 8. The user can no longer physically move the claw into the device when the stop position has been reached, and subsequently moves the device off of the claw. During the above process of inserting and withdrawing the claw, the marker/electrode 1 tip simultaneously deposits a bright white paint mark on the surface of the non-quick region of the claw.

Figure 2:
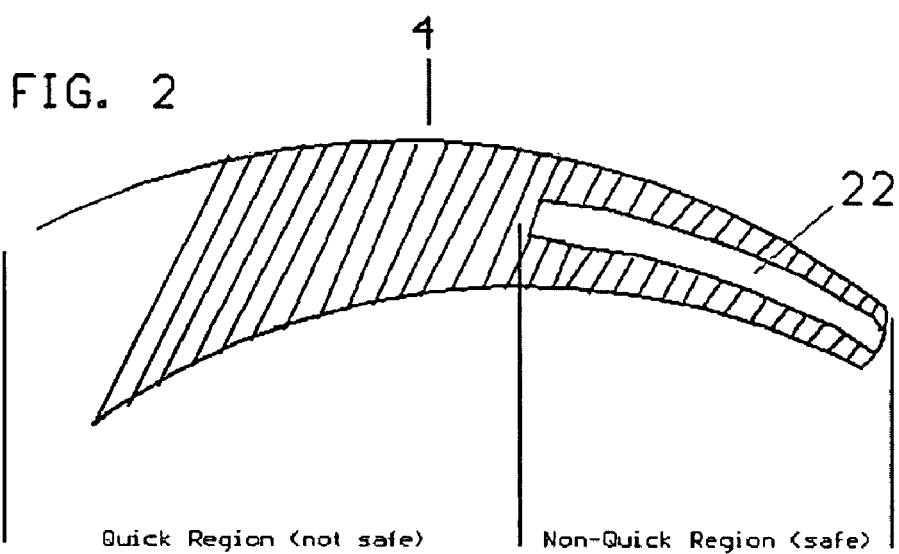
FIG. 2 is side view of the resultant claw identification mark as created by the claw marking tool embodiment appears as a longitudinal line on the claw.

FIG. 2 shows the resulting white paint mark 22, and how it relates to the visually hidden live tissue quick region of an animal claw. Using this identifying white mark, the user can quickly and safely trim the animal claw with no complications (bleeding, pain and potential infection).

Claw Trimmer Using Conductivity Sensing Method

As noted earlier, there are prior art patents for integrated quick sensing claw trimmers that claim one or several possible methods to potentially detect the position of live tissue within an animal claw. The experimentally confirmed live tissue sensing method disclosed here is distinct from all prior art methods, and the resultant apparatus can obviously be attached to an existing claw trimmer for added user convenience.

Figure 3:
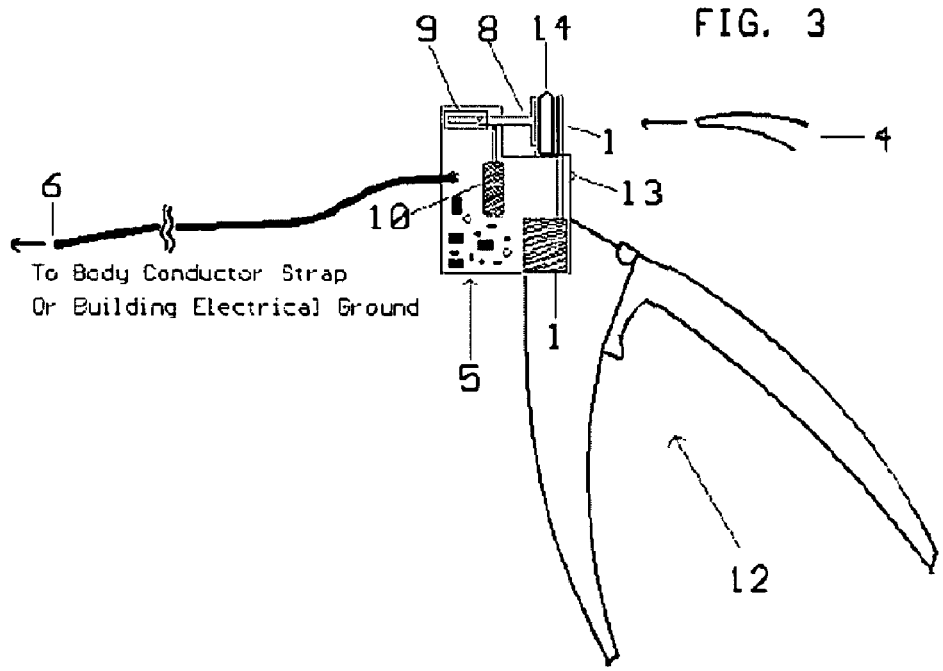
FIG. 3 is a side view of an annual claw trimmer attachment tool embodiment, constructed in accordance with the invention, attached to a common style claw trimmer.

FIG. 3 shows a common style claw trimmer 12 with an attachable assembly comprising a modified form of parts 1 and 5 described earlier. In this application, a non-pigment wet electrode 1 custom assembly, comprising a porous plastic claw receptacle with liquid reservoir or wick, is attached to the claw trimmer. The reservoir continuously wicks the electrode with the wet polar saline solution. In another embodiment the operator could deliberately wick the electrode the reservoir manually.

Also attached to the claw trimmer is sensor electronics PC board assembly 5. The attachable custom assembly of 1 and 5 slides over the cutting head of stock claw trimmer 12 and is secured in place using the existing screw mounting holes 13 of stock claw trimmer 12. When the user inserts animal claw 4 into trimmer cutting hoop surface 14, the animal claw 4 first contacts porous plastic claw electrode receptacle 1 and subsequently moves spring loaded position sensor/stop 8 while sensor electronics 5 begins sampling signal amplitude as described in the previous operation discussion. Electrode receptacle 1 mechanically expands as claw 4 is continually inserted, maintaining consistent wet electrode contact with claw keratin surface.

The user continues to slide the device over the animal claw until the live tissue quick region is approached by electrode receptacle 1, at which time, sensor electronics 5 detects a substantial increase in the AC signal amplitude. In this embodiment, however, there is no visible ink mark necessarily transferred to the claw. Instead, the locking of position sensor/stop 8 functions to provide an accurate quick position reference for holding the claw trimmer at any desirable distance from the quick. The exact delay position to lock sensor/stop 8 relative to electrode receptacle 1 is simply derived from linear potentiometer 9 position, and the offset can be user adjustable to be closer or further away from the quick region. In general, the apparatus will function as an electronically controlled stop to insure the desired cutting position.

Alternative Design for Claw Trimmer Using Conductivity Sensing Method

Figure 5:
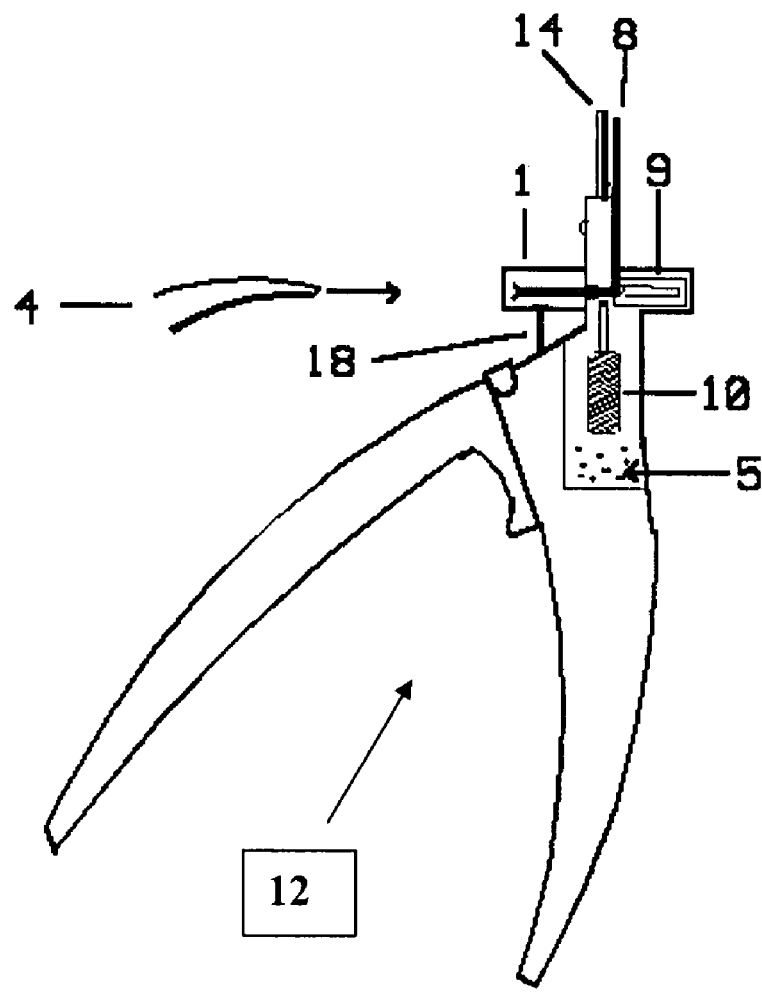
FIG. 5 is a side view of an animal claw trimmer attachment tool embodiment with a multiple point contact head.

FIG. 5 shows a multipoint porous plastic electrode receptacle 1, an animal Claw 4, a sensor electronics PC board assembly 5, a spring loaded stop 8, a linear potentiometer position sensor 9, a stop solenoid 10, a common style claw trimmer 12, a cutting hoop surface 14, and a claw brake 18.

FIG. 5 depicts an integrated, quick sensing claw trimmer that can be feasibly manufactured with off the shelf components and one custom porous plastic part (1). The animal claw is first inserted into multipoint porous plastic electrode receptacle 1 and then common claw trimmer 12 handle squeezed, whereby holding claw stationary via mechanically actuated claw brake 18. Within receptacle 1, multipoint electrode contact is made with alternating laminated segments of wet and dry hydrophilic porous plastic such that quick position can be electronically determined by differential signal sampling. The wet porous plastic segments are electrically active due to polar liquid saturation via saturated wick contact and are connected to sensing amplifier input by sequential commutation (sampling), while the dry segments are simply open to ambient air drying. The each multipoint of the receptor electrode must be electrically insulated to avoid bridging and becoming one common conductor. The live tissue position is accurately determined by relative signal amplitude difference between the electrically active wet segments. Simultaneously, when claw is inserted multipoint porous plastic electrode receptacle 1, spring loaded linear potentiometer (position sensor) 9 is proportionally actuated such that the relative signal amplitude difference can be directly translated to claw quick position. The claw quick position information is represented by a DC reference voltage via position sensor 9, and upon claw retraction from receptacle 1, said reference voltage is used to electronically trigger stop solenoid 10 such that spring loaded stop 8 is locked into a fixed position to prevent claw insertion into cutting hoop surface 14 beyond a safe cutting region, thus preventing the common style claw trimmer 12 from cutting live tissue quick. To prevent bacterial and or fungal growth, the multipoint porous plastic electrode receptacle 1 is wetted using off the shelf contact lens storage and disinfecting solution. An LED is illuminated when receptacle 1 wick saturation drops below level and requires rewetting through wick access hole.

Multipoint Porous Plastic Electrode Receptacle

In this embodiment, a claw receptacle may be provided to permit the multipoint contacts to conform to the shape of the claw so that the claw is contacted by the multipoint contacts. The number of multipoint contacts by the receptor electrode is directly proportional to the position sensing resolution of the device. The higher the number of multipoint contacts by the receptor electrode is desirable because higher resolution generated creates a more accurate sensing tool.

Figure 6:
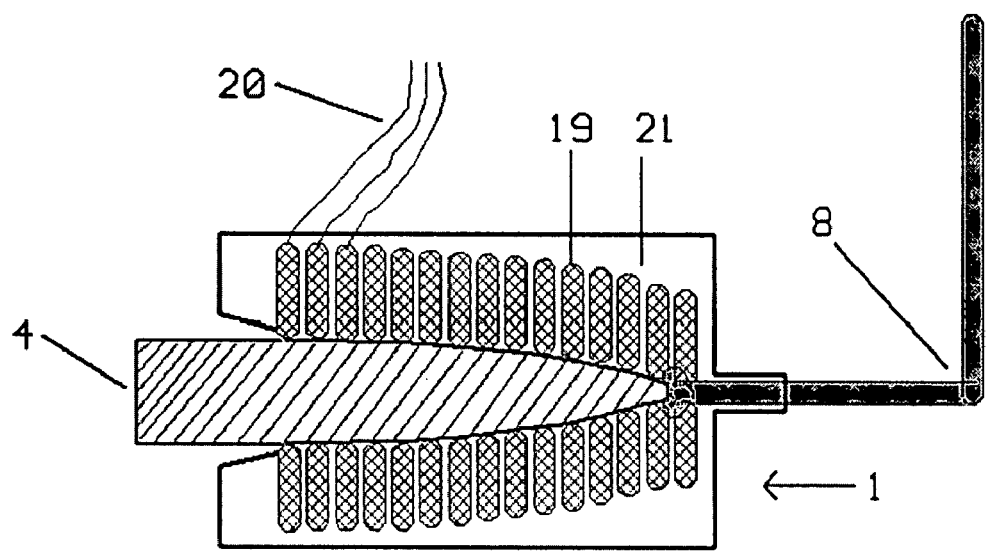
FIG. 6 is a top cross sectional view of an animal claw inserted into a Multipoint Porous Plastic Electrode Receptacle assembly.

FIG. 6 depicts a top cross sectional view of an animal claw 4 inserted into multipoint porous plastic electrode receptacle assembly 1. Individual hydrophilic electrode contact points 19 conform to the claw and make contact with the animal claw 4 while remaining electrically isolated in reference to each other. Insulating cavity 21 is a pliable, conforming structure that surrounds electrode contact points 19, thereby providing both insulation and constant force contact with animal claw 4. The composition of insulating cavity 21 can be either hydrophobic, displacing polar liquid between electrode contact points 19 on claw surface, or hydrophilic, absorbing polar liquid between electrode contact points 19 on claw surface. If insulating cavity 21 is hydrophilic, it is necessary that electrode contact points 19 have hydrophobic coating sheath where in contact with insulating cavity 21, but remain exposed where contact is made with animal claw 4. Conducting wires 20 are embedded into electrode contact points 19, providing electrical continuity to each. Electrode contact points 19 can be wetted with polar solution via an external cap with segmented wick insert between uses, or internally wetted via interior ports and an on-board wicking system.

The use of hydrophobic composition for insulating cavity 21 is preferable, provided that the water displacing effect can remove any bridging between the segments. A hydrophilic composition is more complicated, but it will "wick away" any water bridges between the segments.

This assembly may be made as a clamp, rather than a continuous contact receptacle as described above and in FIG. 6. In this case, a simple air gap between electrode segments would be suitable as long as animal claw is held stationary after the clamp is in place.

What is claimed is:
1. A system for detecting the quick of an animal claw, the system comprising
   a claw cutter;
   a detection low level alternating current signal source; and
   a scanhead comprising a receptor electrode, wetted by a polar liquid, the receptor electrode having multiple electrically isolated points of contact with at least a portion of the keratin surface of the animal claw, and receptor electrode voltage detection circuitry to identify the presence or absence of live tissue based on the alternating current signal amplitude or phase characteristics.

2. The system of claim 1 wherein the receptor electrode further comprises multiple electrically isolated points of contact.

3. The system of claim 1 wherein the multiple electrically isolated points of contact further comprise a plurality of regions of a porous hydrophilic material; and a plurality of insulating regions selected from the group consisting of a porous hydrophobic material, an electrically insulating material, or an air gap.

4. The system of claim 1 wherein the scanhead is formed in the shape of a receptacle cavity that readily accepts the animals claw.

5. The system of claim 1 further comprising a source electrode attached to the skin of the animal, such that the low level alternating current signal source is provided to the source electrode.

6. The system of claim 5 wherein the source electrode further comprises a conducting body strap contacting animal skin.

7. The system of claim 1 wherein the low level alternating current signal source is ambient radiated building power line electrical noise.

8. The system of claim 1 further comprising a marker positioned in proximity to the receptor electrode.

9. The system of claim 1 further comprising an electromechanical stop controlled by the receptor electrode voltage detection circuitry.

10. The system of claim 1 further comprising a claw cutter.

11. A claw cutter device comprising:

a claw cutting means; and a positioning system for properly positioning the claw cutting means, such that an animal's claw is not cut in the quick, the positioning system comprising a receptor electrode, wetted by a polar liquid, the receptor electrode having multiple electrically isolated points of contact with at least a portion of the keratin surface of the animal claw, a detection low level alternating current signal source, and receptor electrode voltage detection circuitry to identify the presence or absence of live tissue based on the alternating current signal amplitude or phase characteristics.

12. The claw cutter device of claim 11 further comprising a source electrode attached to the skin of the animal, such that the low level alternating current signal source is provided to the source electrode.

13. The claw cutter device of claim 12 wherein the second electrode further comprises a conducting body strap contacting animal skin.

14. The claw cutter device of claim 11 wherein the low level alternating current signal source is ambient radiated building power line electrical noise.

15. The claw cutter device of claim 11 wherein the receptor electrode further comprises a claw receptacle cavity.

16. A method for sensing live tissue within an animal claw, the method comprising contacting the keratin surface of the animal claw with a receptor electrode having multiple electrically isolated points of contact with the keratin surface;

wetting the receptor electrode with a polar liquid;

providing a detection low level alternating current signal through at least a portion of the skin surface of the animal;

determining the voltage at the receptor electrode at a plurality of positions on the claw;

detecting the presence of the claw quick from the voltage; and marking or cutting the claw in a non-quick area.

17. The method of claim 16 wherein providing a low level alternating current signal further comprises attaching a source electrode to the skin of the animal; and providing an oscillator output to the second electrode.

18. The method of claim 16 wherein providing a low level alternating current signal further comprises utilizing ambient radiated building power line electrical noise.

19. The method of claim 16 further comprising cutting the claw at the mark.

20. The method of claim 16 wherein detecting the presence of the claw quick from the voltage further comprises determining the voltage at a plurality of points along the claw; and determining which of the plurality of points has the largest difference in voltage with respect to its neighboring points.

* * * * *